US006599618B1

(12) United States Patent
Simmon, Jr.

(10) Patent No.: US 6,599,618 B1
(45) Date of Patent: Jul. 29, 2003

(54) WAVELENGTH SELECTIVE PHOTOCATALYTIC DIELECTRIC ELEMENTS ON POLYTETRAFLUOROETHYLENE (PTFE) REFRACTORS HAVING INDICES OF REFRACTION GREATER THAN 2.0

(76) Inventor: Frederick Lee Simmon, Jr., 232 Millsaps Ave., Jackson, MS (US) 39202

( * ) Notice: Subject to any disclaimer, the term of this patent is extended or adjusted under 35 U.S.C. 154(b) by 0 days.

(21) Appl. No.: 09/315,593

(22) Filed: May 20, 1999

(51) Int. Cl.$^7$ .............................. B32B 7/00; B32B 18/00
(52) U.S. Cl. ...................... 428/212; 428/213; 428/215; 428/421; 428/422; 428/432; 428/446; 428/699; 428/701
(58) Field of Search ................................ 428/212, 421, 428/422, 699, 702, 701, 446, 426, 432, 213, 215

(56) References Cited

U.S. PATENT DOCUMENTS

| | | | | |
|---|---|---|---|---|
| 5,194,989 A | * | 3/1993 | Ferrante et al. | 359/583 |
| 6,027,766 A | * | 2/2000 | Greenberg et al. | 427/226 |
| 6,046,403 A | * | 4/2000 | Yoshikawa et al. | 136/257 |
| 6,103,363 A | * | 8/2000 | Boire et al. | 428/325 |
| 6,154,311 A | * | 11/2000 | Simmons et al. | 359/359 |

* cited by examiner

Primary Examiner—Vivian Chen
(74) Attorney, Agent, or Firm—Wallenstein & Wagner, Ltd.

(57) ABSTRACT

This invention relates to a photocatalytic dielectric element placed upon polytetrafluoroethylene (PTFE) refractors and lamp covers to provide a self-cleaning surface for use on roadway lighting fixtures. The photocatalytic dielectric element is comprised of a series of hard durable thin dielectric film layers that can be tailored to selectively reflect UV with a plurality of dielectric layers having indices of refraction greater than 2.0. The photocatalytic dielectric element is otherwise transmissive to light at all other wavelengths. In addition, the photocatalytic dielectric element can concentrate photons generating from the light fixture, or from direct sunlight within a narrow range of wavelengths on the outer surface of the polytetrafluoroethylene refractor or lamp cover. In turn this promotes photocatalytic reactions that decompose bacteria and other organic contaminates that contact the polytetrafluoroethylene refractor or lamp cover where the photocatalytic dielectric element is placed upon, thus, making the light fixture self cleaning. The photocatalytic dielectric element can be placed on what is termed as, "difficult to adhere to substrate materials", such as the polytetrafluoroethylene, while maintaining good adhesion without delamination, in addition to most any other substrate material. The photocatalytic dielectric element preferably has been deposited on the surface of the polytetrafluoroethylene refractor by dual alternating low-pressure environment deposition techniques.

10 Claims, 4 Drawing Sheets

1b
PTFE Refractor
or Lampcover

1a
Roadway
Lighting
Fixture

WAVELENGTH SELECTIVE PHOTOCATALYTIC DIELECTRIC ELEMENTS ON POLYTETRAFLUOROETHYLENE (PTFE) REFRACTORS HAVING INDICES OF REFRACTION GREATER THAN 2.0

BACKGROUND OF INVENTION

The present invention relates generally to self-cleaning coatings and, more particularly, to the adhesion of photocatalytic dielectric elements placed upon polytetrafluoroethylene (PTFE). The invention reflects UV light while concurrently inducing photocatalytic reactions of anatase $TiO_2$ on the surface of an optical substrate (PTFE), and is used for producing self-cleaning refractors and lamp covers on roadway lighting fixtures.

Outdoor lighting fixtures are often exposed to harsh conditions, such as weather, exhaust from vehicles, air pollution from factories, dirt and grime kicked up from the road, etc. All these factors and more contribute to reduce light output from roadway lighting fixtures. Therefore, the refractors or lamp covers on the fixtures require continuous cleaning. However, if the degradation is too bad, the refractor or lamp cover must be replaced. Most refractors and lamp covers are made of plastic, but exposure to UV light, such as the UV light present in sunlight, can cause a variety of problems for these plastic covers. For example, UV light can cause plastic materials, such as acrylic and polycarbonate materials, to craze as a result of photo-induced chemical cross-linking. Plastics exposed to UV light develop a network of fine cracks, yellowing, and loss of physical properties.

Polytetrafluoroethylene (PTFE) is appealing because it has excellent impact resistance and weatherability. PTFE also has excellent "plastic memory," meaning that if compressive or stress forces are applied to the PTFE, it has the ability to retain its original form or shape. Further, PTFE is not affected by UV and has excellent transmissive properties. Though the surface is considered "non-stick" and slippery, static build-up can cause matter to be attracted to the surface and result in some loss in light transmission.

Methods have been investigated in using photocatalysts on the surface of light fixtures to provide a self-cleaning surface. Currently, photocatalytic films are deposited on various substrate materials using the Sol-Gel method. The film comprises one or more layers of photoreactive gelatin which have been subsequently developed by wet chemical processing. Such a process is disclosed in "Applications of Photocatalytic Reactions Caused by TY02 Film to Improve the Maintenance Factor of Lighting Systems," by H. Honda, A. Ishizala (1), R Soma (2), K. Hashimoto, and A. Fujishima (3), Winter 1998; *Journal of the Illuminating Engineering Society*. Taught is a substrate which is dipped into a titanium alkoxide solution, TPT monomer or polymer chelated with glycol polymer. There may be variations in the mixture as far as what is used, but the process manner is the same such that the rate in which the substrate is pulled out determines the coating thickness. The coated substrate is then heated to about 600° C. to form the crystalline anatase phase. However, the sol-gel process is very limited in that very few substrate materials can be exposed to such high temperatures without deforming, burning, out-gassing or melting.

In addition, it is usually desirable to construct the film with fringes that are parallel to the surface of the gelatin. However, design constraints, such as optically recorded noise patterns, may prevent this construction. In these cases, the fringes intersect the surface and form a slant fringe pattern, which produces extraneous diffraction images. Such diffraction images can make this process unacceptable for roadway lighting fixtures.

Another limitation of the sol-gel method is mechanical abrasive damage to which the film is extremely susceptible. Still a further problem of the sol-gel method is the tendency of the layers of the film to delaminate both from the substrate and from other adjacent layers therein. The delamination is due to the differing coefficients of expansion between the various layers of the film, such that as the substrate is subjected to varying thermal conditions, the layers expand and shrink at varying ratios resulting in delaminations between the layers and substrate.

It would be desirable to develop a photocatalytic anatase $TiO_2$ film that is hard, durable and abrasion resistant, which will not delaminate or distort surfaces. It is also desirable that such a film could be deposited on polytetrafluoroethylene and on a variety of other substrate materials, such as plastics, metals, glass, and composites to be used in various applications, such as lighting, window, and other optical applications, to provide a self-cleaning surface.

SUMMARY OF THE INVENTION

The self-cleaning roadway lighting fixture herein disclosed comprises a polytetrafluoroethylene (PTFE) refractor, or lamp cover, upon which a number of alternating layers of thin dielectric films are deposited to form the photocatalytic dielectric element of the present invention. The PTFE can be transmissive for wavelengths of light or non-transmissive to wavelengths of light. In both cases the photocatalytic dielectric element deposited on the PTFE substrate is highly reflective for wavelengths of light within a predetermined spectrum and is otherwise transmissive. The photocatalytic dielectric element is an optically clear, multilayered, hard, durable, thin film comprised of an external contact layer of photocatalytic anatase $TiO_2$, reflects greater than 90% of UV light having a wavelength of 350 nm to 400 nm, and is comprised of a series of tailored thin film dielectric reflectors designed with narrow contoured spectral bandwidths to reflect light within a predetermined spectrum. The photocatalytic dielectric element filters light and reflects selected wavelengths of light from the lamp within the light fixture or from direct sun light. The selected wavelength of light is then reflected back to the external contact layers of the photocatalytic dielectric element producing a concentration of photons at the external surface of the element, thus initiating photocatalytic reactions at the surface of the element. This creates a self-cleaning surface on the PTFE substrate that decomposes most bacteria and organic contaminates that contact the surface.

The photocatalytic dielectric element eliminates the occurrence of distortion which can possibly occur with the sol-gel method. Additionally, the photocatalytic dielectric element is less likely to delaminate from the PTFE and does not require environmental protection. The photocatalytic dielectric element is less susceptible to mechanical abrasion damage and does not require complex wet chemical development, as does the sol-gel method. The photocatalytic dielectric element is functional in both indoor and outdoor applications. The element can be placed on almost any substrate material, including, but not limited to, polytetrafluoroethylene, plastics, metals, polymers, or composites to achieve high UV reflectance and high photopic transmittance. It also provides surfaces the photocatalytic dielectric element is placed upon with a self-cleaning surface. The photocatalytic dielectric element has been preferably deposited upon a polytetrafluoroethylene substrate using dual alternate reduced pressure environment techniques.

Thin, optical film, computer design codes with optimization routines are commercially available with which dielectric coatings can be tailored. A suitable software package is FILMSHOW by FTG Software Associates, Princeton, N.J.

It has been generally accepted that the adhesion between a thin dielectric film and a soft, nonstick material, such as PTFE, would be too weak, and not capable of providing any lasting adhesive bonds. The arguments would be that any amount of flex in the material causes the thin dielectric film to fracture and delaminate from the PTFE, or that the fracturing would ruin the function of the dielectric element. An aspect of this invention is that alternating layers of thin dielectric films with good adhesion to PTFE are possible. Furthermore, if the photocatalytic dielectric element should contain cracks or fractures, it would still function adequately as a self-cleaning element. In addition, if during its lifetime the dielectric layers become fractured, its function as a photocatalytic dielectric element continues, with some loss regarding transmission of light. However, the overall performance of the photocatalytic dielectric element exceeds that of organic methods, such as the sol-gel method.

DETAILED DESCRIPTION OF PREFERRED EMBODIMENT

Figure 1:
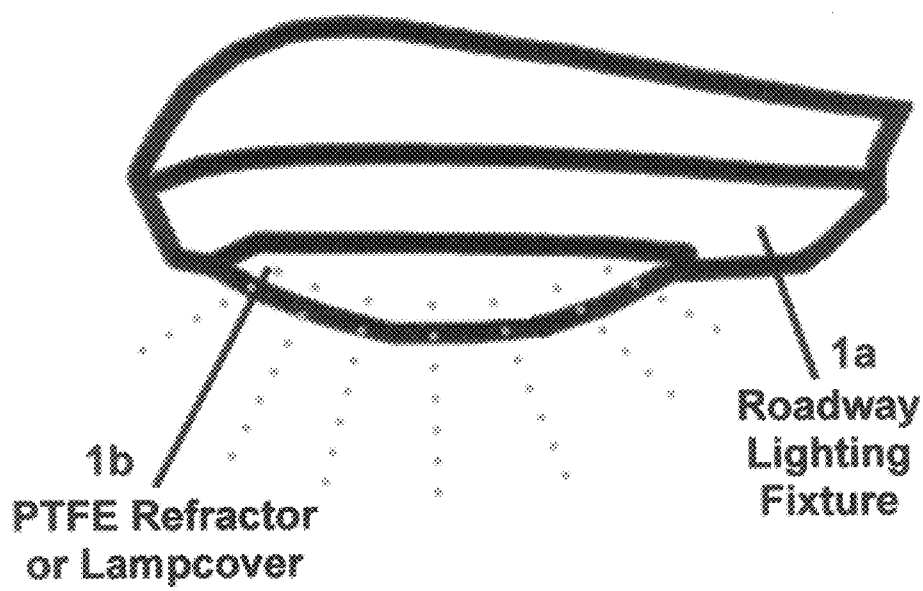
FIG. 1 is a side view of a roadway lighting fixture having a polytetrafluoroethelyne (PTFE) refractor or lamp cover coated with the photocatalytic dielectric element.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. In addition, the thicknesses of the various layers have been exaggerated in the drawings for the purposes of clarity.

FIG. 1 illustrates a side view of a roadway lighting fixture 1a having a polytetrafluoroethylene (PTFE) refractor or lamp cover 1b which is coated with the photocatalytic dielectric element according to the present invention. However, the photocatalytic dielectric element can coat a variety of optical substrates other than roadway refractors and lamp covers, such as the windows in a building, a greenhouse, lenses in eyeglasses, or other optical devices. In addition to PTFE, the photocatalytic dielectric element can coat optical substrates formed of a variety of materials, such as glass, plastics or metals. For example, the photocatalytic dielectric element of the present invention can also coat, but is not limited to, plastic substrates, such as PET, PETG, ABS, acrylic or polycarbonate. In addition, the photocatalytic dielectric element can coat metal substrates, such as aluminum substrates, without departing from the spirit and scope of the present invention.

Figure 2:
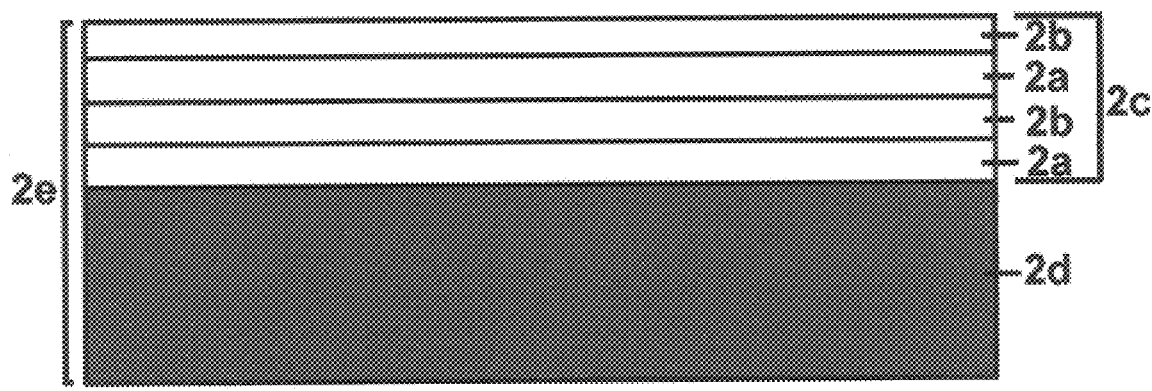
FIG. 2 is an illustration of a photocatalytic dielectric element placed upon the substrate.

Referring now to FIG. 2 a portion of an optical element, such as a refractor, lens, or lamp cover of a lighting fixture according to one embodiment of the present invention is illustrated. The optical element includes a PTFE substrate 2d, which is coated with the photocatalytic dielectric element 2c in order to reflect a high percentage of UV light while concurrently inducing photocatalytic reactions on the surface of the PTFE substrate. This provides a self-cleaning surface according to a preferred embodiment of the present invention. The PTFE substrate 2d is a flexible transmissive film in which the substrate may be from 0.001" to 3" thick, preferably 0.003" to 1" thick. In this embodiment, the substrate is a refractor or lamp cover for a roadway light fixture.

PTFE is the most slippery material in existence. It has a coefficient of friction that is less than the coefficient of friction for ice. This is due to the fluorine atoms that are attached in pairs to each carbon atom. This comes about as a result of polymerization when smaller molecules, called monomers, join together to form longer chains called polymers. This results in free radical vinyl polymerization in which the double bond that exists between the two carbon molecules of tetrafluoroethylene become single bonded carbon molecules. When a free radical (a free electron) attacks the pi-bond between the two carbons another free radical results, which then attacks another double bond, and so on, until after possibly thousands of cycles a long straight or branched chain is constructed. This also gives polytetrafluoroethylene (PTFE) the unique ability to heal itself or have excellent "memory."

Further, if PTFE is subjected to tensile or compression stresses, after the discontinuance of the stresses, reheating the strains tends to release themselves within the PTFE as it resumes its original form. Prior to depositing the photocatalytic dielectric element upon the PTFE, it is necessary to break or sever the surface bonds of the PTFE to assure adhesion of the photocatalytic element to the surface. This can be accomplished under pressure in a vacuum chamber a number of ways: by a RF etch; by electron bombardment; or, by ionized oxygen in oxygen plasma.

Referring again to FIG. 2, the photocatalytic dielectric element 2c deposited upon the PTFE substrate 2d is comprised of a plurality of alternating layers of a first material 2a and second material layer 2b of anatase titanium ($TiO_2$). Each of the alternating layers has a high index of refraction so as to maximize the light reflected. Preferably, the material forming each of the two alternating layers has an index of refraction greater than 2.0. Additionally, the difference in refractive index of the materials forming each of the two alternating layers is as small as possible. This increases the light reflected at the predetermined wavelength, and induces photocatalytic reactions on the surface of the photocatalytic dielectric element placed upon the PTFE substrate.

The photocatalytic dielectric element, which is comprised of a number of alternating layers of a first dielectric material 2a and the second dielectric material 2b, can be deposited upon the PTFE substrate in a variety of manners, as known to those skilled in the art. For example, because the PTFE is not extremely temperature sensitive, the photocatalytic dielectric element can be deposited upon PTFE substrate by means of evaporative coating, in which the temperature is held at least as high as 300° C. in order to obtain a relatively hard layer. Alternatively, the photocatalytic dielectric element can be deposited upon a PTFE substrate by means of ion-assisted deposition, reactive ion plating or similar processes known to those skilled in the art.

Two environmentally stable coating methods for producing dielectric films are available; reactive ion plating (RIE) and ion assisted deposition (IAD). Both are vacuum deposition methods that produce dense, hard dielectric thin films without columnar microstructures and can be produced by similar ion beam technology. Both Optical Coating Laboratory, Inc. of Santa Rosa, Calif. and Omitec Thin Films Ltd., of Totnes, England are examples of facilities where dielectric thin films made using IAD techniques and tailored as demanded by performance requirements can be applied. Both processes are also desirable because they enable multiple identical photocatalytic dielectric elements to be produced within a vacuum chamber at the same time.

Figure 3:
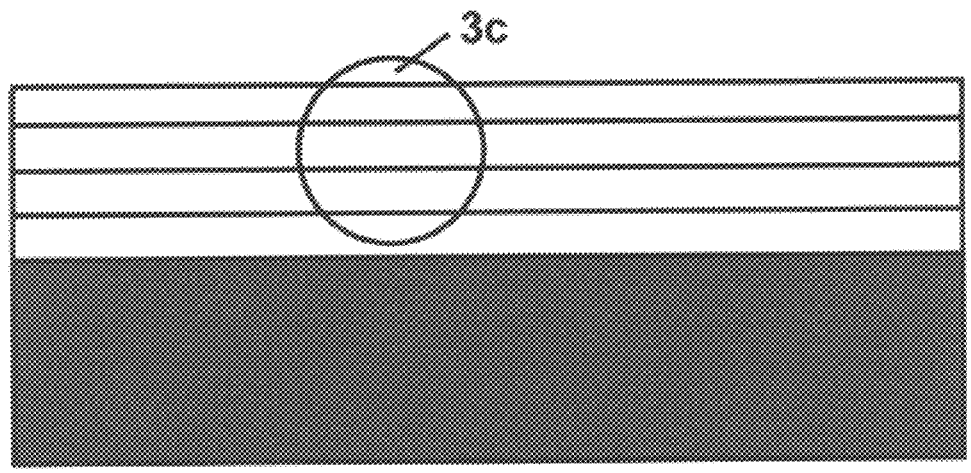
FIG. 3 is an illustration of a crosscut (see FIG. 4) of photocatalytic oxidation reactions of anatase $TiO_2$ on the surface of a photocatalytic dielectric element.
Figure 4:
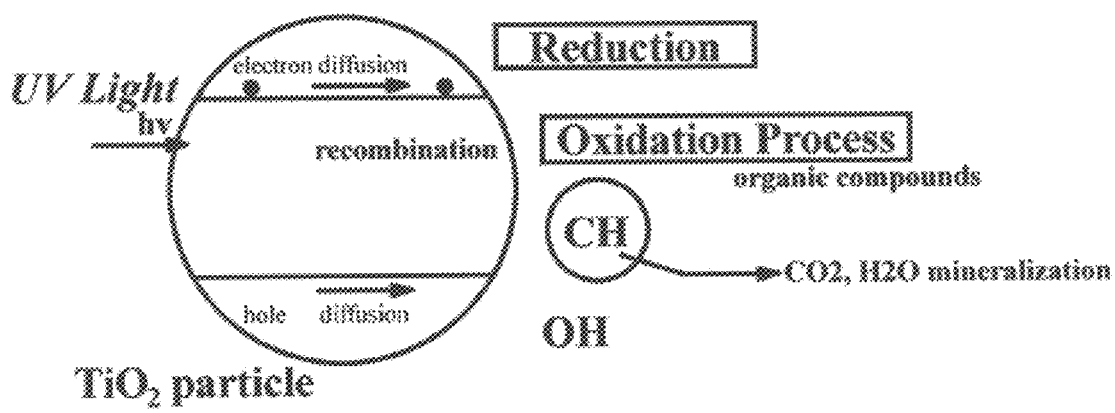
FIG. 4 is an illustration of the photocatalytic oxidation process of anatase $TiO_2$.

A sectional view of the photocatalytic dielectric element $3c$, referring to FIG. 3, incorporating the principles of this invention is shown in FIG. 4. Anatase $TiO_2$ is the photocatalysts material illustrated. When the photon energy is greater than or equal to the band gap energy of $TiO_2$, i.e., $E=3.2$ ev or $\lambda \leq 400$ nm, an electron (e-) is promoted from the valence band into the conduction band, leaving a hole behind. Some of the electrons, which have been excited into the conduction band and some of the holes in the valence band recombine and dissipate the input energy as heat. However, a number of holes can diffuse to the surface of the $TiO_2$ and react with—OH absorbed on the surface. This reaction forms—OH radicals, which can decompose the organic compounds existing on the surface into $CO_2$ and $H_2O$ because the potential energy of the —OH radical is greater than the bonding energy of almost all organic compounds.

Referring to FIG. 2, the photocatalytic dielectric element $2c$ is deposited upon the PTFE $2d$. The photocatalytic dielectric element $2c$ is comprised of a plurality of alternating layers $2a$, $2b$ of a first and second dielectric material layer of anatase titanium dioxide ($TiO_2$). The first layer $2a$ is preferably deposited by ion assisted deposition (IAD), and the second material layer $2b$ is preferably deposited by reactive ion plating (RIE). Each of the alternating layers have a high index of refraction so as to maximize light reflected at the predetermined wavelength. Preferably the material forming each of the two alternating layers has an index of refraction greater than 2.0. Additionally, the difference in the refractive index of the materials forming each of the two alternating layers should be as small as possible. Preferably, the photocatalytic dielectric element $2c$ formed of a plurality of alternating layers of anatase titanium dioxide ($TiO_2$), have an index of refraction between 2.39 and 2.49, more preferably 2.49. Additionally, the photocatalytic dielectric element $2c$ is designed to reflect light waves of a wavelength within a predetermined spectrum, as hereinafter described, while remaining highly transmissive for light waves of all other wavelengths.

While the layers of the photocatalytic dielectric element $2c$ may be of any desired thickness, the layers are preferably of the third order such that the mechanical thickness of each of the individual layers is determined by the formula: mechanical thickness=

$$(3 \times \lambda)/(4 \times n)$$

where $\lambda$ is the wavelength of light to be reflected by the photocatalytic dielectric element and "n" is the index of refraction of the material forming the particular layer.

By utilizing third order layers, the number of necessary layers is decreased to simplify the design and fabrication of the photocatalytic dielectric element. The formula assumes a 0° angle of incidence between the incident light wave and a line perpendicular to the surface of the substrate. For example, the wavelength of light to be reflected may be 400 nanometers, and assuming the index of refraction for a thin film of titanium dioxide ($TiO_2$) is 2.49, the mechanical thickenss would be 120.5 nanometers. An identical procedure is also utilized to determine the thickness of the other layer. The wavelength of light to be reflected may thus be precisely controlled by the choice of an appropriate thickness for the individual dielectric layers. Therefore, the photocatalytic dielectric element $2c$ does not necessitate the complex wet chemical development processing for photocatalytic reactions required by the sol-gel method. Additionally, the photocatalytic dielectric element $2c$ is less likely to delaminate or suffer abrasion under normal conditions.

Figure 5:
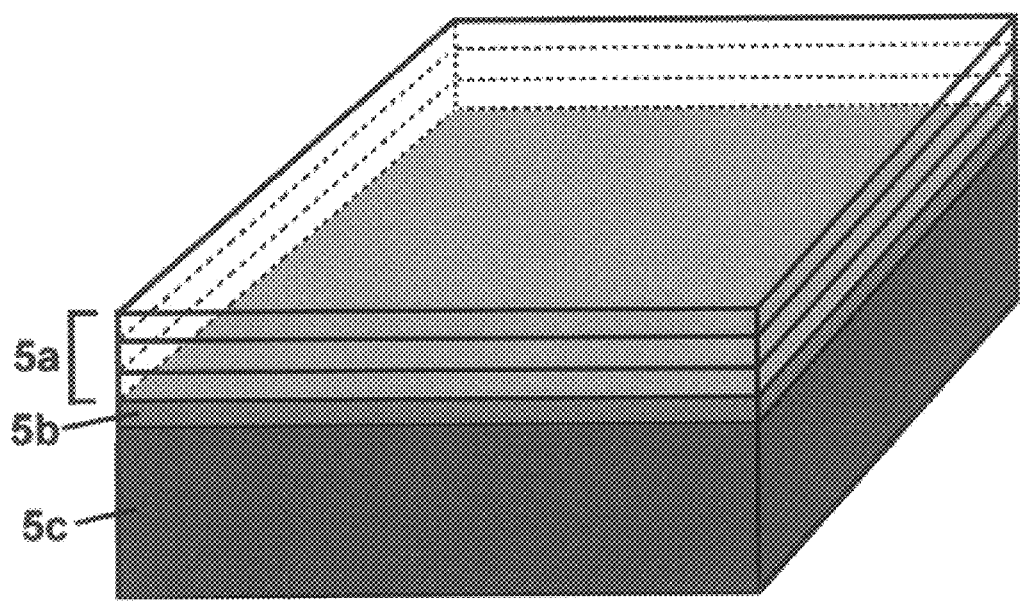
FIG. 5 is an illustration of a photocatalytic dielectric element placed upon an interfacial bonding layer.

Referring to FIG. 5, an alternative embodiment is provided whereby the plurality of alternating layers comprising the photocatalytic dielectric element $5a$ is comprised of an interfacial bonding layer $5b$ of either tantalum oxide ($Ta_2O_5$) or zirconium oxide ($ZrO_2$). Each of these layers has an index of refraction of 2.25.

Alternatively, the photocatalytic dielectric element $5a$ may have an interfacial bonding layer of aluminum oxide ($Al_2O_3$) or silicon dioxide ($SiO_2$) deposited upon the PTFE $5c$ prior to depositing the photocatalytic element. However, other compounds could be utilized if they are durable.

The interfacial bonding sub-layer is transmissive, negligible, and does not induce a photocatalytic reaction. Nor is it designed to reflect light at a predetermined wavelength. The purpose of the interfacial bonding sub-layer between the PTFE and the plurality of layers of the photocatalytic dielectric element, is to serve as a bonding layer for better adhesion. The interfacial bonding sub-layer is covered by the photocatalytic dielectric element $5a$ composed of photocatalytic anatase ($TiO_2$). This induces photocatalytic reactions on the surface of the element. The photocatalytic dielectric element $5a$ is also designed to reflect light waves of a certain wavelength within a predetermined spectrum, as hereinafter described, while remaining highly transmissive for light waves of all other wavelengths.

The interfacial bonding layer $5b$ is preferably formed to be thinner than the photocatalytic dielectric element $5a$. In particular, the respective thickness of the interfacial bonding layer is preferably $$\frac{o\lambda}{4}.$$

Thus, the interfacial bonding layer has an optical thicknesses of a quarter wavelength.

Figure 6:
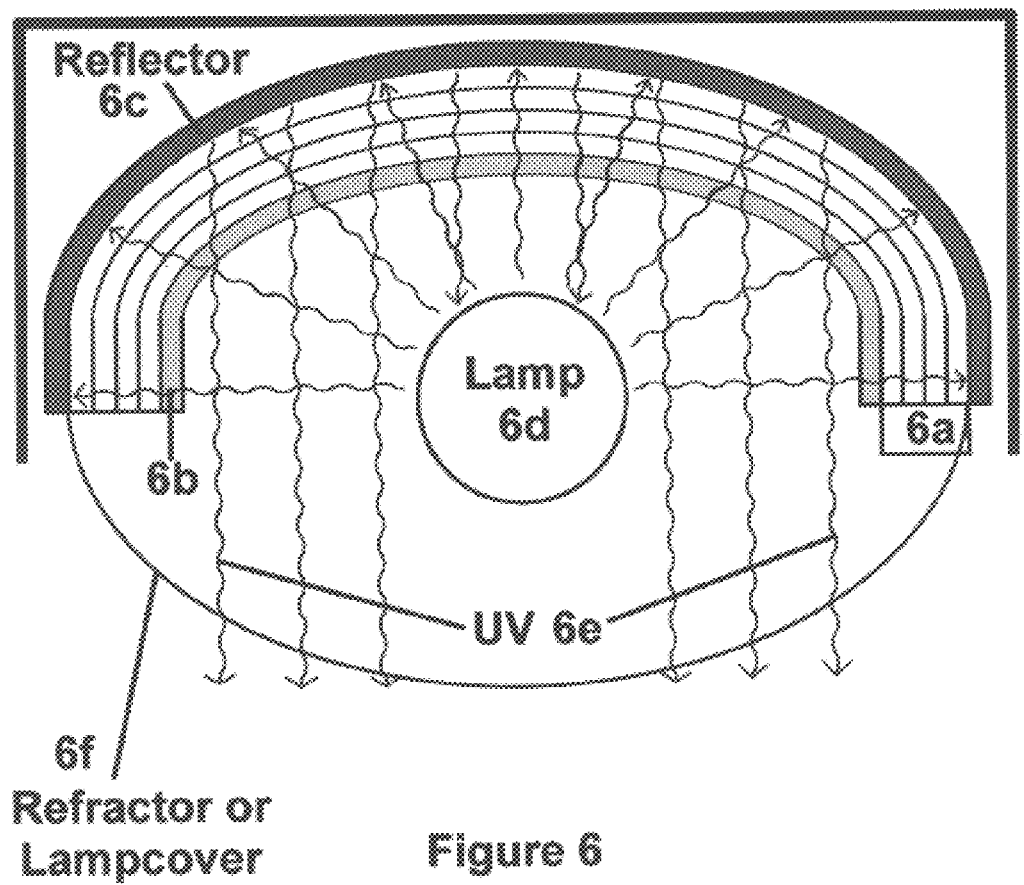
FIG. 6 is an illustration of a photocatalytic sub-stage concentrator placed on a light fixture.

Referring now to FIG. 6, an additional embodiment, which can be used for indoor applications or environments without sunlight, such as tunnels, is illustrated. In this embodiment, the photocatalytic dielectric element $6a$ is placed on the reflector of a light fixture $6c$, such as a luminaire, to concentrate the UV $6e$ emitting from the lamp $6d$ whereby the plurality of alternating layers of anatase titanium dioxide ($TiO_2$) are covered by a thin transmissive layer $6b$, such as, aluminum oxide ($Al_2O_3$), or silicon dioxide ($SiO_2$). The transmissive dielectric layer is preferably chosen so as to be transmissive for all wavelengths of light and to form a photocatalytic sub-stage concentrator. In allowing light of all wavelengths to pass through the transmissive layer, the light can then be filtered by the plurality of alternating layers of anatase titanium dioxide ($TiO_2$) underneath, and then, within a predetermined spectrum, UV is reflected back through to the surface of the transmissive layer, thus increasing UV at the surface of the transmissive cover layer two fold, and also producing an excellent UV resistant barrier.

It is doubtful electrons of the photocatalytic titanium oxide (TiO$_2$) could force through the transmissive dielectric film to induce true photocatalytic reactions on the surface of the reflector in the presence of UV. However, this embodiment functions as an excellent UV reflective concentrator. It could be used to reflect a concentration of UV to an alternate photocatalytic dielectric element placed upon the refractor or lens cover 6f and induce photocatalytic reactions on the surface of the lens, thus making the surface self-cleaning.

The transmissive dielectric layer 6b is preferably formed to be thinner than the photocatalytic dielectric element 6a. In particular, the respective thickness of the transmissive dielectric layer is preferably $$\frac{\circ\lambda}{4}.$$

Thus the transmissive dielectric layer has an optical thicknesses of a quarter wavelength.

Another alternative embodiment is provided, referring to FIG. 2, whereby the plurality of alternating layers of anatase titanium dioxide (TiO$_2$) comprising the photocatalytic dielectric element 2c are deposited in an alternating fashion by reactive ion plating and evaporative coating. Reactive ion plating provides a layer of the material which is more dense than that provided by evaporative coating. This is due to air gaps in the material introduced by evaporative coating. Thus, the first dielectric material 2a is deposited by reactive ion plating and the second dielectric material 2b is deposited by evaporative coating. Thus, the index of refraction of the material deposited by reactive ion plating is greater than that of the same material deposited by evaporative coating. The difference in the index of refraction of 0.2–0.3 is observed for photocatalytic titanium dioxide.

Since the same materials are being deposited by both the reactive ion plating 2a and the evaporative coating methods 2b, the coefficient of thermal expansion of the layers is identical although the index of refraction of the layers vary. Because the coefficient of thermal expansion is identical between the plurality of layers, each layer will expand or contract at an equivalent rate such that delaminations do not occur as with the sol-gel method. However, the plurality of layers forming the photocatalytic dielectric element 2c will provide alternating layers having differing indices of refraction. This provides the necessary reflection of UV within the desired wavelength band to enable the photocatalytic dielectric element to properly function, as referenced in FIG. 4.

In addition to the concept of a self-cleaning photocatalytic surface coating, and the possibilities in which the photocatalytic dielectric element have been discussed, it is obvious that the photocatalytic dielectric element could be utilized in many other applications. These include UV protective applications, sunglasses, or window coverings. Although there has been illustrated and described specific detail and structure of operations, it is clearly understood that changes and modifications may be readily made therein by those skilled in the art without departing from the spirit and the scope of this invention.

That which is claimed is:

1. A device for reflecting UV light while concurrently inducing photocatalytic reactions comprising:
   a) a substrate;
   b) a photocatalytic dielectric element comprised of a plurality of alternating layers of a first and second dielectric material, wherein the first and second dielectric materials are the same said first and second dielectric material comprising anatase titanium dioxide (TiO$_2$), and each of the alternating layers has an index of refraction so as to maximize the light reflected, wherein the photocatalytic dielectric element is deposited upon the substrate such that the substrate surface adheres the photocatalytic dielectric element; and
   c) wherein the alternating layers of the first dielectric material and the second dielectric material are of the third order, such that the mechanical thickness of each of the individual layers is determined by the formula $(3\times\lambda)/(4\times n)$, where "$\lambda$" is the wavelength of light to be reflected by the photocatalytic dielectric element and "n" is the index of refraction of the material.

2. A device according to claim 1, wherein the difference in refractive index of the anatase titanium dioxide (TiO$_2$) forming the alternating layers of the first and second materials is minimized to induce photocatalytic reactions on the surface of the photocatalytic dielectric element.

3. A device according to claim 2, wherein photocatalytic reactions are induced in the presence of UV when photon energy is greater than or equal to the band gap energy of TiO$_2$.

4. A device according to claim 1, further comprising a reflectance region in which greater than 90% of UV light having a wavelength in the range of 350 nm to 400 nm is reflected.

5. A device according to claim 1, further comprising an interfacial bonding layer.

6. A device according to claim 5, wherein the interfacial bonding layer is selected from a group consisting of Ta$_2$O$_5$, ZrO$_2$, Al$_2$O$_3$ and SiO$_2$.

7. A device according to claim 6, wherein the interfacial bonding layer has an optical thickness of one-quarter of the wavelength of light to be reflected by the photocatalytic dielectric element.

8. The photocatalytic dielectric element as recited in claim 1, wherein both the first dielectric material and the second dielectric material are comprised of the same material and the first material is deposited by reactive ion plating, while the second dielectric material is deposited by evaporative coating.

9. A device according to claim 1, wherein the material forming each of the two alternating layers has an index of refraction in the range of from about 2.39 to about 2.49.

10. A photocatalytic sub-stage concentrator, comprising:
   a photocatalytic dielectric element which reflects greater than 90% of UV and is designed to induce photocatalytic reactions in the presence of light, having a transmissive dielectric cover for transmitting light therethrough placed over a plurality of alternating dielectric layers of a first and second material, wherein the first and second dielectric materials are the same and reflect light at a predetermined spectrum, wherein said first and second dielectric materials are anatase titanium dioxide (TiO$_2$), and wherein the transmissive dielectric cover layer placed over a photocatalytic dielectric element is selected from a group consisting of Ta$_2$O$_5$, ZrO$_2$, Al$_2$O$_3$ and SiO$_2$, has an optical thickness of one-quarter of the wavelength of light to be reflected by the photocatalytic dielectric element, and is transmissive to all wavelengths of light, and wherein the reflected UV is concentrated and reflected back through the surface of the transmissive layer.

* * * * *